Patented Feb. 18, 1941

2,232,485

UNITED STATES PATENT OFFICE 2,232,485

AMIDOMETHYL ESTERS

Joseph Harrel Shipp, Wilmington, Del., assignor to E. I. du Pont de Nemours & Company, Wilmington, Del., a corporation of Delaware No Drawing. Application December 15, 1938, Serial No. 245,931

7 Claims. (Cl. 260—404)

This invention relates to organic compounds and more particularly to compounds which are esters and amides.

This application is a continuation-in-part of my copending United States Patent 2,146,408.

This invention has as an object the preparation of a new class of compounds. A further object is the preparation of materials of use in the improvement of textiles. Other objects will appear hereinafter.

These objects are accomplished by the following invention which comprises monobasic monocarboxylic acid esters of N-monomethylolamides of monobasic monocarboxylic acids and their preparation from N-monomethylolamides of monobasic monocarboxylic acids and acylating agents of monobasic monocarboxylic acids.

The following examples which are not to be considered as limiting the invention and wherein parts are by weight and temperatures are in centigrade degrees illustrate the invention in terms of the acetate of the methylol derivative of commercial stearamide which is a mixture consisting essentially of stearamide and palmitamide with small and for the purposes of the invention negligible amounts of other long chain amides.

Example I

Ten parts of methylolstearamide, M. P. 105° derived from commercial stearamide and containing approximately equal proportions of methylolstearamide and methylolpalmitamide is mixed with 30 parts of acetic anhydride. At room temperature no sign of reaction occurs. The mixture is then heated at 70° for two hours. The methylolamide soon dissolves. Upon cooling, the reaction mixture forms a white crystalline pulp. The crystals are filtered off and washed with cold benzene. The product is much more soluble in benzene and ethyl alcohol than the original methylolstearamide. It consists of plates melting at 87°. Found: C, 69.7; H, 11.8. Calculated for an equimolar mixture of palmitamidomethyl acetate and stearamidomethyl acetate; C, 69.7; H, 11.4. Saponification number found, 158.5; calculated 164.2.

A mixture of equal parts of acetic acid and acetic anhydride may be used in place of the acetic anhydride. The product obtained is identical in its properties.

The methylolstearamide is prepared by mixing 255 parts of commercial stearamide with 1150 parts of ethanol at room temperature, heating the mixture to 50°, adding 116 parts of 37% aqueous formaldehyde and thereafter 30 parts of 31% aqueous sodium hydroxide, heating the mixture for 1 hour at 50°, cooling and filtering. The product melts at 104°.

Paraformaldehyde may be used in place of the formalin but the latter is preferred. Other alkaline catalysts, e. g. $Na_2CO_3$ may be employed.

In some instances it is possible to effect reaction between the formaldehyde, amide and acylating agent simultaneously.

Example II

Ten parts of methylolstearamide is heated with 30 parts of acetic acid containing 2 parts of concentrated sulfuric acid at 70° for two hours. The product obtained is the same as that produced by Example I but several recrystallizations from benzene are necessary in order to obtain the same melting point.

Example III

A 5% solution in benzene is made from the acetyl derivative of methylolstearamide. Pieces of mercerized unfinished cotton broadcloth, previously impregnated with 1% of lactic acid and dried, are impregnated with the solution, wrung until the weight of fabric plus solution equaled twice the dry weight of the fabric, dried at room temperature and then baked at 150° for 10 minutes. The fabrics obtained are strongly water repellent and even after boiling with mild soap solution for one hour are still very resistant to wetting.

In the process of the present invention any monomethylolamide of a monobasic monocarboxylic acid may be employed. The methylolamides may be prepared as above and include the N-monomethylol derivatives of aliphatic, alicyclic, aromatic and heterocyclic monoamides, e. g. caprylamide, capramide, undecylenamide, lauramide, myristamide, oleamide, stearamide, arachidamide, benzamide, m-toluamide, phenylacetamide, picolinamide, nicotinamide, pyromucamide and hexahydrobenzamide. The N-monomethylol derivatives of fatty acids of at least eight carbon atoms are greatly preferred. It has been found that methylolamides containing 8 or more carbon atoms possess a high degree of stability under the conditions required for esterification, which permits the economical production of the esters in good yield in useful form. The methylolamides derived from acids containing less than 8 carbons are more readily involved in side reactions and decomposition and hence great pains must be taken in order to obtain good yields of useful products. In order that welldefined products may be obtained it is essential that the methylolamide used for the reaction should be a monomethylolamide of a monobasic monocarboxylic acid and not be of a resin forming type such as the methylolureas. The N-monomethylol derivatives may be prepared from formaldehyde and the amide as indicated above.

The N-monomethylolamide of the monobasic monocarboxylic acid may be esterified by any acylating agent of a monobasic monocarboxylic acid including the acid anhydrides, acid halides or other mixed organic-inorganic anhydrides and the acids themselves. The anhydrides of the acids are particularly suitable since the by-products introduced by these reagents are essentially harmless. The acylating agents may contain other groups which do not take part in the reaction such as halogen or ether groups. Examples of suitable acids whose halides, anhydrides, etc. may be used include acetic, butyric, lauric, stearic, benzoic, methacrylic, propionic, isobutyric, nicotinic, pyromucic, hexahydrobenzoic and oleic. The preferred esterifying reagents are those products introducing acyl groups containing 4 or less carbon atoms. Among such acids are acetic, propionic, butyric and isobutyric. Organic bases such as dimethyl aniline or catalysts such as sulfuric acid may also be used to promote the reaction. The process is also applicable to the Schotten Baumann procedure using dilute caustic soda as catalyst, due care being taken of course to minimize hydrolysis of the methylolamide or the resulting ester during the process by suitable control of the temperature and other factors.

The preferred products of the present invention may be represented by the formula $R_1$—CO—NH—CH$_2$—O—CO—$R_2$ $R_1$ and $R_2$ being monovalent aliphatic hydrocarbon radicals, $R_1$ having at least seven carbon atoms and $R_2$ having not more than three carbon atoms and defined as esters of an aliphatic monobasic monocarboxylic acid having not more than four carbon atoms with an N-monomethylolamide of an aliphatic monobasic monocarboxylic acid of at least eight carbon atoms, e. g., a fatty acid of at least eight carbon atoms.

Example III above illustrates one utility of the ester amides of the present invention. Other inert organic solvents, other concentrations, and other catalysts may be employed. The temperature and time of baking may be varied, lower temperatures generally requiring a longer time of heating. These ester amides are also useful as wax-blending agents, as plasticizers for resinous products, cellulose derivatives, etc.

The compounds of the present invention are new and the process of their preparation is surprisingly effective since the methylolamides are unstable and would be expected to break down under the drastic conditions of esterification. The products of the present invention are much more soluble in organic solvents than are the parent methylolamides and are good solvents perhaps because of the presence of the amide and ester groups. They are of further advantage in their high melting and boiling points.

The new derivatives are a very useful class of esters. The long chain methylolamide esters exhibit the very interesting and valuable property of rendering fabrics, particularly those of cellulosic origin, waterproof, the water repellency not being removed by severe laundering.

The above description and examples are intended to be illustrative only. Any modification of or variation therefrom which conforms to the spirit of the invention is intended to be included within the scope of the claims.

I claim:

1. A lower monobasic monocarboxylic acid ester of an N-monomethylolamide of a higher monobasic monocarboxylic acid.

2. An ester of an aliphatic monobasic monocarboxylic acid having not more than four carbon atoms with an N-monomethylolamide of a fatty acid of at least eight carbon atoms.

3. An ester of the formula $$R_1—CO—NH—CH_2—O—CO—R_2$$

wherein $R_1$ is a monovalent aliphatic hydrocarbon radical of at least seven carbon atoms and $R_2$ is a monovalent aliphatic hydrocarbon radical of not more than three carbon atoms.

4. Stearamidomethyl acetate.

5. The acetate of the N-monomethylolamide of commercial stearic acid, said commercial stearic acid being a mixture of stearic and palmitic acids with small amounts of other long chain acids.

6. Process which comprises esterifying an N-monomethylolamide of a higher monobasic monocarboxylic acid with an acylating agent of a lower monobasic monocarboxylic acid.

7. Process which comprises esterifying an N-monomethylolamide of a fatty acid of at least eight carbon atoms with an acylating agent of a monobasic aliphatic monocarboxylic acid of not more than four carbon atoms.

JOSEPH HARREL SHIPP.